United States Patent [19]

Duffy

[11] Patent Number: 4,605,329
[45] Date of Patent: Aug. 12, 1986

[54] HYDRAULIC TRANSPORTATION OF OBJECTS

[75] Inventor: Geoffrey G. Duffy, Takapuna, New Zealand

[73] Assignee: Fibre Dynamics Limited, Takapuna, New Zealand

[21] Appl. No.: 545,347

[22] Filed: Oct. 25, 1983

[30] Foreign Application Priority Data

Oct. 29, 1982 [NZ] New Zealand ............... 202329

[51] Int. Cl.$^4$ ............................................. B65G 53/30
[52] U.S. Cl. ................................. 406/49; 406/197; 137/13
[58] Field of Search ............... 406/197, 49, 46, 193; 137/13

[56] References Cited

U.S. PATENT DOCUMENTS

| | | | |
|---|---|---|---|
| 3,040,760 | 6/1962 | Macks | 137/13 |
| 3,268,263 | 8/1966 | Van Olphen | 406/197 X |
| 3,826,279 | 7/1974 | Verschuur | 137/13 X |
| 4,397,748 | 8/1983 | Argabright et al. | 137/13 X |
| 4,440,543 | 4/1984 | Echtler | 406/49 |

Primary Examiner—Joseph F. Peters, Jr.
Assistant Examiner—L. E. Williams
Attorney, Agent, or Firm—Connolly & Hutz

[57] ABSTRACT

A method and apparatus for hydraulically transporting objects, including particulate material such as coal, along a conduit. A supporting material such as a quantity of flexible fibres are mixed into a liquid and their tendency to flocculate therein is utilized to create a network which will support the objects in the liquid. The objects can be supported in the mix while it is pumped along a conduit, for example a pipe, to thus transport the objects. At the outlet a separation means removes the objects from the mix of liquid and supporting material.

4 Claims, 12 Drawing Figures

HYDRAULIC TRANSPORTATION OF OBJECTS

BACKGROUND OF THE INVENTION

This invention relates to a method and apparatus for hydraulically transporting objects including objects having a specific gravity greater than one. It is envisaged that the invention will be particularly suitable for hydraulically transporting objects in the form of a quantity of particulate material. The invention is primarily concerned with utilizing water as a transporting medium however other liquids may be utilized.

It is already known to hydraulically transport particulate material having a specific gravity greater than one. As a matter of convenience and cost water is normally utilised as the transporting liquid. The material and transporting liquid are combined to form a slurry which is then pumped or otherwise caused to travel along a pipe, conduit or similar supporting structure. There are considerable limitations in attempting to transport particulate material in this manner.

A first requirement is to finely crush the material to provide a particulate material comprised of minute particules to achieve a "pumpable" and otherwise flowable slurry. The finer the particles required the greater is the need to crush and thus the less cost effective the method. Further, the finer the particle size the more difficult it is to de-water the particles at their destination. Thus the transporting of particulate material as a slurry often requires extensive supplementary apparatus and processing both upstream and downstream of the system.

A further disadvantage in utilizing a slurry technique is the essentially abrasive nature of slurries. Thus the particle population of the medium must be limited otherwise the friction becomes too high rendering the slurry unpumpable. The friction also manifests itself in the form of abrasive wear on the supporting structure increasing the need for maintenance and replacement. This abrasive nature of a slurry also provides a further disincentive to attempt to pump larger particles as the attrition factor between particles can become self defeating as it tends to reduce the particle size.

A further problem in pumping a slurry is the settling-out of the particles. Settling tends to occur with reduction in the rate of flow, sedimentation resulting with zero flow. Thus a prime mover, conventionally a pump, needs to have a capability of maintaining a rate of flow which will avoid this problem. Should the prime mover fail and the flow stop, the settling of particles can create a deposit which may not clear with reinstatement of the liquid flow. This is a substantial problem with known slurry pipelines and to avoid stand-down time to clear such a blockage auxillary pumps are normally utilised. This problem and the additional cost in attempting to circumvent it also detracts from utilising a slurry approach in the transporting of particulate material.

The aforesaid problems increase with the distance over which transportation is required. This has also tended to limit the utilisation of hydraulic transportation for the carrying of particulate material over extensive distances. For example, very substantial quantities of detritus material such as coal and metal ores often must be transported a considerable distance from their point of extraction. For a variety of reasons conventional transporting means such as railways and road haulage, are becoming less desirable. The provision by this invention of a suitable hydraulic transporting method and apparatus provides a realistic alternative for the passage of such materials over extensive distances.

OBJECTS OF THE INVENTION

This invention is distinguishable from hydraulic transportation of an object by way of a slurry by the utilization of a material within the liquid to facilitate supporting the object to be hydraulically transported. In the following description and claims "object" means an object or particle thereof of a mass such that the object will be supported at least during hydraulic transportation by a supporting material in a liquid whereby hydraulic transportation is achieved.

It is an object of this invention to provide a method and apparatus of hydraulically transporting objects, at least a quantity of particulate material or a mixture of materials in particulate form.

It is further object of this invention to provide a method and apparatus for hydraulically transporting a quantity of particulate material which will go at least some way towards minimizing the disadvantages and limitations discussed above with respect to the pumping of slurries.

SUMMARY OF THE INVENTION

According to one aspect this invention provides a method of hydraulically transporting an object including the steps of the controlled depositing of the object into a quantity of a supportive material within a liquid, the supporting material being contained in a volume of the liquid and having been previously or simultaneously to the depositing of the object constituted to be capable of substantially supporting that object in the liquid and, either before or after the depositing of the object, therein causing the mix of the supportive material and liquid to flow along a conduit to convey the object therealong and then, discharging the mixture and separating at least the liquid from the object.

According to a second aspect this invention provides a method of hydraulically transporting a solid as described in the preceding paragraph wherein the supportive material is created by a network of flexible fibres.

According to a third aspect this invention provides a method of hydraulic transportation as described in the preceding paragraph including the step of injecting a layer of fluid to form a fluid stream barrier between the conduit and the fibre liquid network.

According to a fourth asepct this invention provides a method of hydraulic transportation as described in the preceding paragraph wherein the fluid is a liquid containing a fibre network suspended therein to form a fibre liquid network.

According to yet a further aspect of this invention there is provided an installation for transporting an object comprising an impervious conduit commensurate in length to the distance of transportation required and terminating at a delivery end thereof, a prime mover means capable of causing a liquid to flow as a stream along the conduit toward the delivery end an inserting device to mix a quantity of a supportive material into the liquid stream, a charging means for the controlled deposit of an object into the mix of supportive material in the liquid and a separation device to receive the discharge at the delivery end of the conduit and to separate the liquid from the solid.

BRIEF DESCRIPTION OF THE DRAWINGS

An embodiment of the invention will now be more particularly described by way of example with reference to the accompanying drawings, in which.

DESCRIPTION OF THE PREFERRED EMBODIMENT

Figure 1:
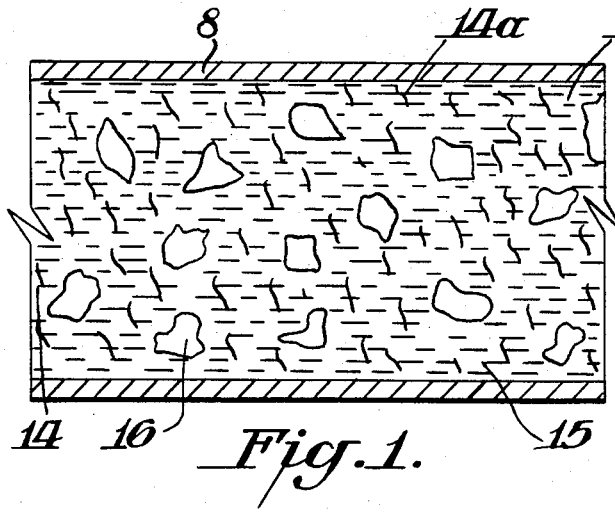
FIG. 1 is a schematic longitudinal section of a portion of a pipeline with a fibre liquid network supporting particulate material as a continuous stream therein.

The pumping of wood pulp fibres through pipes is a well established process. Considerable study has been made in that field to achieve better designed and more efficient pumping and pipeline installations. The reader is directed to that field of technology and in particular to the various issues of "Tappi", being The Journal of the Technical Association of the Pulp and Paper Industry and publications of the Swedish paper industry "Svensk Papperstidning" for supportive information useful in understanding the present invention.

One of the inherent properties of suspensions of paper pulp fibres is their tendency to flocculate and form three-dimensional fibre networks. At concentrations corresponding to those normally encountered in paper making, there is insufficient free volume for the fibres to move in a shear field without collision. Because of the flexible nature of the fibres, collisions produce small bundles of entangled fibres to which other fibres adhere. Fibre aggregates grow by further collisions and flocs are formed. When agitation ceases the flocs interlock to form coherent fibre networks. The flocs so developed by mechanical entanglement form localized variations of concentration in the fibre network.

The coherent nature of fibre networks cannot be attributed to either chemical bonding or the effect of surface tension forces since networks developed from different synthetic fibres have been observed to produce comparable network properties. The coherence of fibre networks is due to internal stresses set up in the network, primarily by normal forces associated with stresses in the fibre, and the additional frictional forces at the active points of fibre contact.

A three-dimensional fibre network possesses supportive properties similar to those normally encountered in solid materials. Relationships can be determined between the mechanical properties of the network as measured by quasi-static methods and the hydrodynamic behaviour of fibre suspensions.

Referring to FIGS. 1–10 of the drawings, preferably the supportive material consists of a fibre network 14 of wood pulp fibres 14a suspended in water 15. However various other types of fibre including synthetic filaments can be used, with the specific gravity of the fibre material preferably being about 1 or less. The fibre type and concentration may be chosen depending on the type of object, such as a quantity of particulate material 16, to be transported. Further, a fibre network can be created by utilizing a mix of different types of fibre and it is envisaged that other liquids including gels and polymers will be suitable as the liquid medium.

A disruptive shear stress of fibre network 14 can be chosen so as to be greater than the resultant downward force of an object or objects 16 within that network. By this means, objects 16 can be trapped within a fibre liquid network 14 and can thus be maintained in a stable suspension and a pumpable state rendering it possible for the hydraulic transportation of objects 16 including a quantity of particulate material by the utilization of such a fibre network 14. My experiments have shown that the capability of maintaining particulate material solids in such a stable suspension and pumpable state can be maintained for extensive periods even though flow may be halted, leading to the advantages discussed above.

Figure 3:
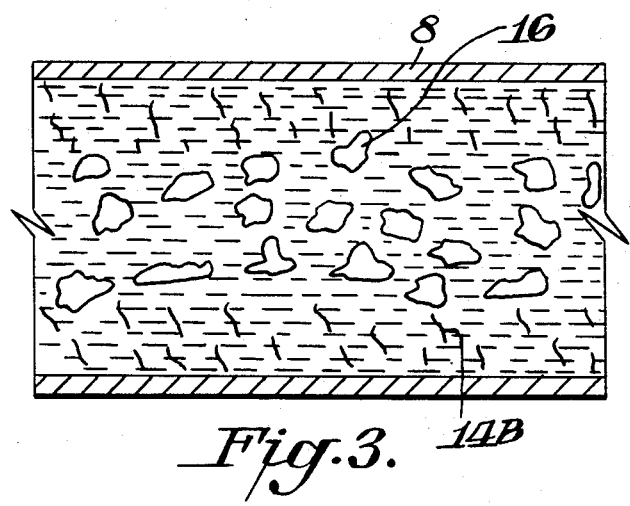
Figure 4:
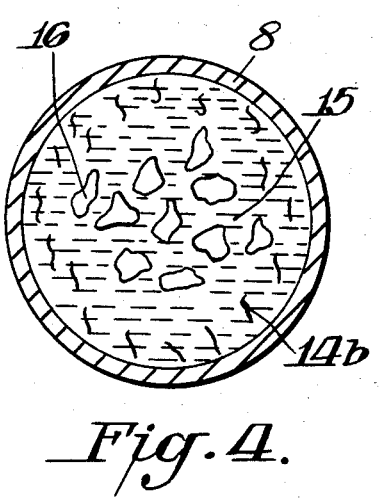
FIGS. 4, 6, 8 and 10 are cross-sectional views of FIGS. 3, 5 and 7 respectively.

My experiments have shown that at low flow rates the fibre network 14 flows as if it was a continuous plug and the main, if not all, the shear occurs at the edge between the fibre network 14 and the wall of the supporting structure 8 conventionally a pipe or open conduit. Consequently, objects 16 trapped wholly inside or on the fibre network 14 as to be spaced from the walls of the supporting structure 8 will not unduly affect the pressure drop or friction loss compared to a fibre network 14 flowing alone. At higher flow rates, a thin turbulent fibre/water annulus can develop and if so the friction loss may be lower than water alone, due to the drag reduction effect of fibres in turbulent motion within the annulus. Referring in particular to FIGS. 3 and 4 this phenomenon is utilized in modified forms of the invention wherein a fibre liquid network layer 14b is provided either as a sole supporting fibre network 14 or as an additional barrier between a principal fibre network and the walls of the supporting structure 8.

Figure 7:
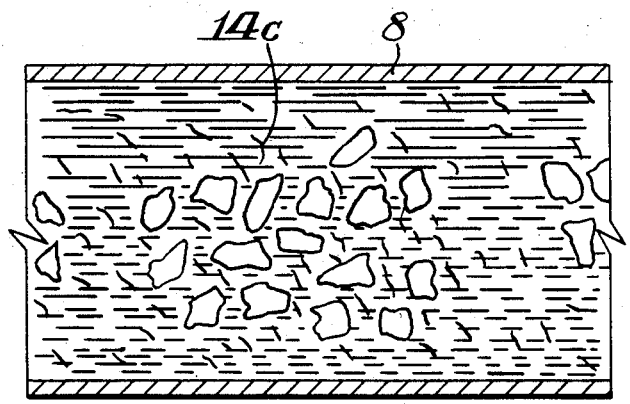
Figure 8:
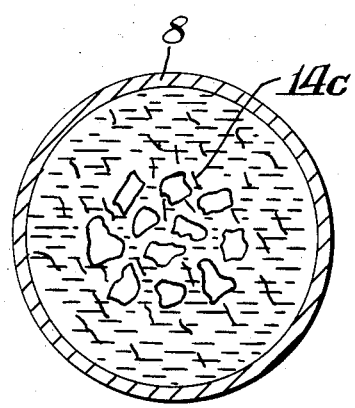
Figure 9:
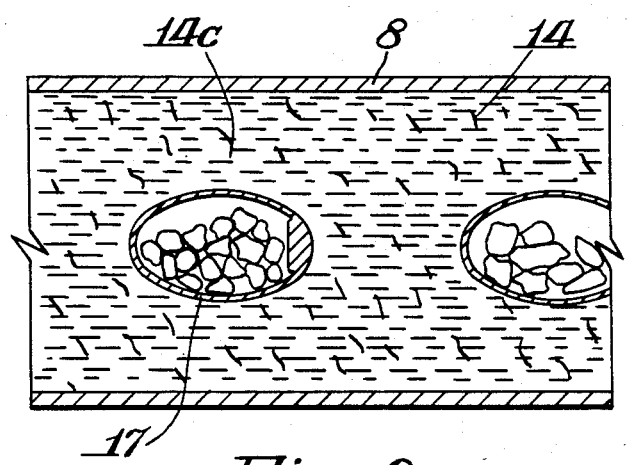
Figure 10:
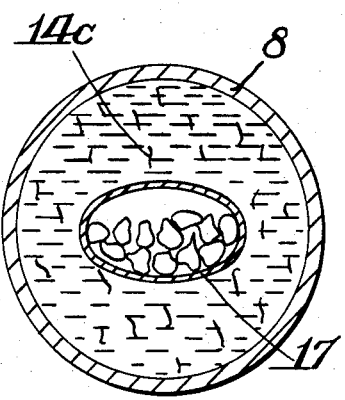

Referring in particular to FIGS. 7 and 8 my experiments have also shown that when the population of objects 16 in the fibre network 14 is high the objects 16 can displace the fibre material 14 in sufficient quantity as to reduce the degree of interlocking continuum character of the fibre network 14. However, in this situation flocs or fibre bundles 14c do become trapped about and between the objects causing the network to tend toward a flocculated character. While this can result in an increase in the friction between the objects 16 and the wall of the supporting structure 8, the effective supportive integrity of the fibre network 14 is maintained as to remain pumpable. Any disadvantage resulting from increase in wall friction is at least partly off-set by the advantage of the flocculated character of the network providing better support to objects 16 under static conditions. This has the advantage of reducing the problem of settling out. Further, with flocculating there is less interaction between objects 16 when in the form of particles of particulate material, with the result that particle attrition is reduced. In certain applications the invention could provide more advantages than disadvantages. For example this approach could be adopted where transportation over considerable distances is concerned and/or the nature of the particulate material 16 involved is such that settling out and attrition could be significant problems.

Many different types of objects 16 including those in the form of particulate material can be transported in accordance with this invention. The invention may be applied to types of coal, gravel, sintered solids, wood chips, mineral ores and a mixture of any one or more of these. As regards mixtures of particulate material 16 it is envisaged for example that suitably particulated refuse comprised of a variety of debris material could be transported in accordance with this invention. Further, referring to FIGS. 9 and 10 it is envisaged that containers such as re-usable plugs, capsules or cylinders 17 or flexible or rigid material could similarly be transported by the fibre liquid network 14 within the character of this invention, that is, the transportation of objects as herein defined utilizing such a supportive material in a transporting liquid.

The required ratio of objects 16 to fibre network 14 concentration and nature of the suspension medium 15 are interdependent and this may require a degree of trial and experiment in applying the invention to any specific task. The important design parameters are the choice of suspension medium 15, supportive material and concentration thereof within that medium, the mode of flow as well as the properties of the object 16 to be transported such as size, shape, density and concentration within the fibre network 14. Supporting structures for the liquid can be opened or closed ducting such as depicted in a pipe 8 or channels formed from conventional materials for example metal or concrete. In extreme situations such as if particularly abrasive material 16 is concerned an additional fluid barrier can be utilized as described in more detail hereafter.

Following are details of experimental tests I have undertaken in respect of the invention. The test equipment involved a P.V.C. pipe having an internal diameter of 150 mm the pipe extended a distance of approximately 100 meters. The outlet of the pipe was disposed higher than the inlet to provide a "head" of about 5 meters. A conventional centrifugal open impeller pump driven by a prime mover driven at 35 kilowatts was utilized together with water as the medium in which a variety of wood fibres were suspended to form a variety of supportive materials in the form of fibre-liquid networks.

In a first series of experiments, coal of particulate sizes between 3 mm and 20 mm was inserted into a fibre liquid network created from long kraft wood fibres at 1.35% mass concentration within the water medium. The mass concentration of the coal particles added ranged up to 33.5%. The flow velocities of the resultant charged fibre liquid network ranged from 0.6 to 4.1 meters per second. At levels of coal concentration less than 14% the friction loss was less than that accounted for by water alone being in the range of 2.5 to 3.2 meters per second. At 3.0 meters per second and 33.5% coal concentration pipe friction was recorded at being double that of water at the same flow rate.

In all cases covered by the above series of experiments the fibre liquid network was stopped to simulate a breakdown to enable particle settling-out to be studied. Hereafter I refer to this as a "static test". For all practical purposes the settling-out of particles did not occur as pumping and the resultant hydraulic transportation of the particulate material was readily and successfully re-started after a period of eight days.

In another series of experiments coal particles of particle size of 12 mm or less was hydraulically transported successfully up to 43.4% mass concentration with mechanical pulp fibre. Re-starting was readily and successfully achieved as part of a "static test" after a period of six weeks.

In yet another series of experiments coal particles ranging from 4 mm to 60 mm at up to 33% mass concentration were successfully transported with friction loss levels approximately double those of water at the same flow rate. Kraft fibre at approximately 1.5% mass concentration was utilised at flow rates between 2-4 meters per second. Static tests were carried out at two and six day periods with success.

In a further series of experiments particles of natural stone sized between 3-10 mm and having a range of specific gravity between 2.0 and 2.8 were hydraulically transported at 13.5% mass concentration in a fibre network comprising 2.5% mechanical pulp fibre suspended in the water medium. Static tests were carried out successfully for periods of up to fourteen days.

Figure 11:
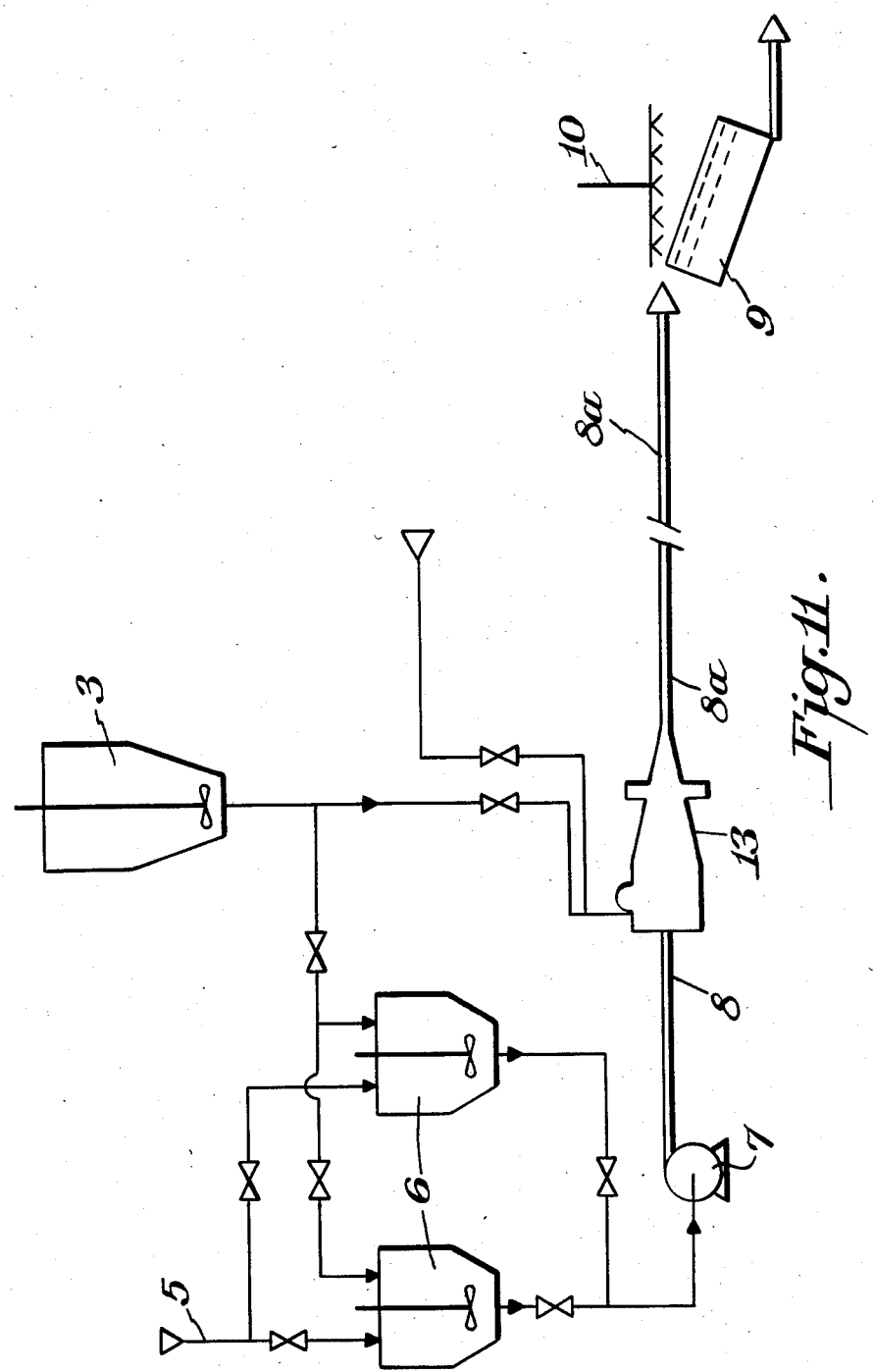
FIG. 11 is a block diagram of an installation for transporting particulate material in accordance with this invention.

FIG. 11 depicts a block diagram of an installation in accordance with this invention. A liquid supply 5, preferably water 15, is fed to a bank of batching tanks 6 into which quantities of particulate material 16 are deposited for controlled mixing with the water 15 and fibre 14. Fibre, preferably suitable wood fibres sourced from a reservoir 3 are also fed to the batching tanks 6. The batching tanks 6 provide and enable control over the mix of the particulate material 16 with the fibre liquid network 14 to a slurry type pump 7 which in turn feeds the supporting structure being a pipeline 8. At its outlet the pipeline 8a discharges onto a de-watering device 9 to separate at least the water 15 of the fibre liquid network 14 from the outfall. A shower 10 can be utilized to facilitate the screening and/or extend the separation of the wood fibre 14 from the particulate material 16.

Figure 12:
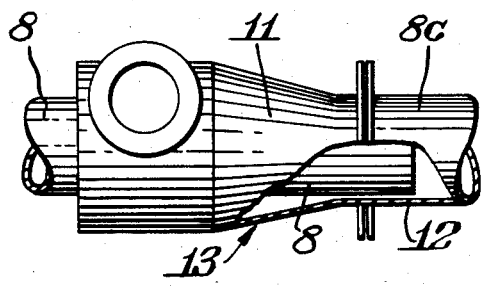
FIG. 12 is a schematic partly sectional side elevation of an injection device for inserting a barrier layer.

Referring to FIGS. 3-6 inclusive, in a modified form of the invention an injector 13 as depicted in FIG. 12 is utilized to create a fibre liquid network 14 and/or inject a liquid layer 15b to provide an additional barrier between the supporting structure 8 and a principal fibre liquid network 14 charged with particulate material 16. The injector 13 comprises a housing 11 of a generally frusto-conical configuration dispsoed concentrically about the transporting pipe 8. A tangentially disposed inlet is provided to housing 11 at an upstream and larger diameter end thereof and through which the material of the additional layer can be charged. At the downstream end of the housing 11 forms an annular shaped outlet port 12 about the pipe 8, the port 12 and the interior of the pipe 8 conjoining in that relationship and forming a continuation 8a of the pipe 8.

Liquid 15 with or without a fibre network 14 created therein can be pumped through the inlet of the injector 13 to become injected into the pipe 8a in a substantially helical flow pattern to thus tend to form an annular layer 14b or 15 between the interior space together with any contents thereof and the wall of the pipe 8a. My experiments indicate that this additional layer approach is appropriate to consider with particle concentrations have approximately 20% by mass. This is particularly so where larger sized particles are concerned.

In an installation, the injector 13 is preferably inserted marginally downstream of the prime mover pump 7 and can be utilised to implement several modifications of this invention. In a first modification (FIGS. 3 and 4) a fibre liquid network 14b is utilized to transport particulate material 16, the fibre network 14 being charged into the pipe 8a by the injector. The particulate material 16 to be conveyed thereby possibly together with some liquid, is charged thereinto via the pump 7 and pipe 8 inlet of the injector 13.

Figure 2:
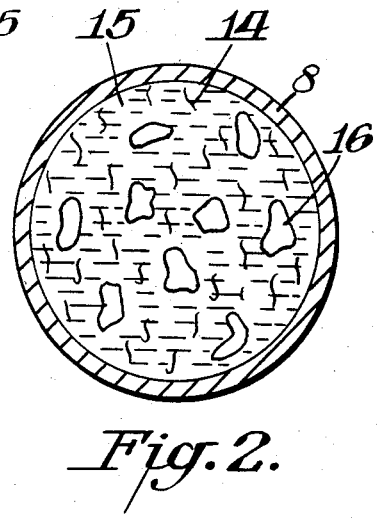
FIG. 2 is a cross-section view of the arrangement depicted in FIG. 1, and FIGS. 3, 5, 7 and 9 are similar views to FIG. 1 depicting modified forms of the invention and similarly.
Figure 5:
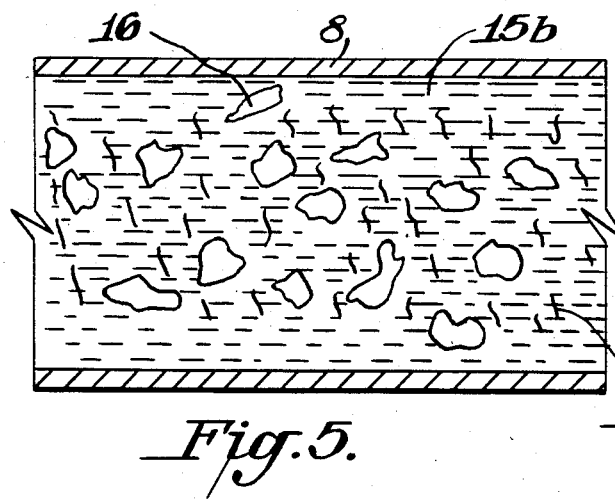
Figure 6:
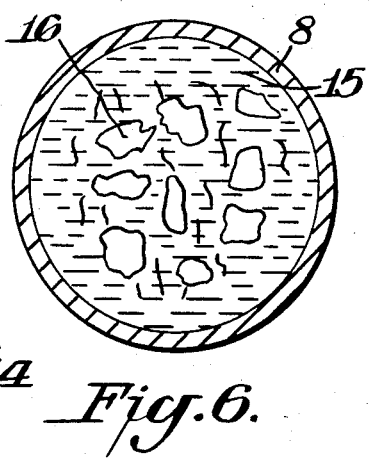

In a further modified form of the invention essentially the same step of injecting a fibre liquid network 14b via the injector 13 is utilized. In this case the injected layer 14b is provided as a supplementary barrier layer between the wall of the pipe 8a and a previously constituted mix of particulate material 16 within a fibre liquid network 14 (such as depicted in FIGS. 1 and 2) within the pipe 8. Variations of this modification can be the injection of either just additional liquid 15b (as depicted in FIGS. 5 and 6) or just additional fibre material 14.

In yet a further modified form of the invention the injector or other means can be used to insert a gas layer between the wall of the supporting structure and any fibre liquid network 14 therein. This approach could be particularly useful with high fibre concentrations, that is, in excess of 7% mass concentration as may be required for the transportation of high S.G. particles. It is envisaged that mass fibre concentrations of up to 30% will be suitable for utilization in this method of transportation. This technique is applied to the pumping of wood pulp as discussed in my paper "High Consistency Flow of Pulp Suspensions in Pipes" published in "Tappi" Volume 61 No. 8 1978.

It will be appreciated that various alterations or modifications may be made to the foregoing without departing from the spirit or scope of this invention. By suitably choosing the fibre/particle admixture as well as the particular flow rate the friction loss within a pipeline may be less than that of pumping water along within that pipeline. Further, it will be appreciated that in some cases, pumping will not be necessary, gravitational forces being utilised as a prime mover means, for example with a pipeline or open duct extending downhill.

I claim:

1. The method of transporting coal, characterized by supplying the coal in pieces about 60 millimeters in size, introducing those pieces into a pipeline along with a stream of water in which is distributed a sufficient concentration of suspended flocculated flexible fibers to support each of the pieces of the coal, and passing the stream of water carrying the thus-supported pieces of coal, through the pipeline.

2. The method of claim 1 in which the concentration of the coal pieces is such as to impart to the coal-carrying fibrous suspension a flowing friction loss less than that of water alone.

3. The method of claim 1 in which the fibers are mechanically pulped wood fibers.

4. The method of claim 1 in which the fibers are wood fibers.

* * * * *